Nov. 11, 1930.  LE ROY H. HOFFER  1,781,548
WELDING CLAMPING DEVICE
Filed Sept. 26, 1929
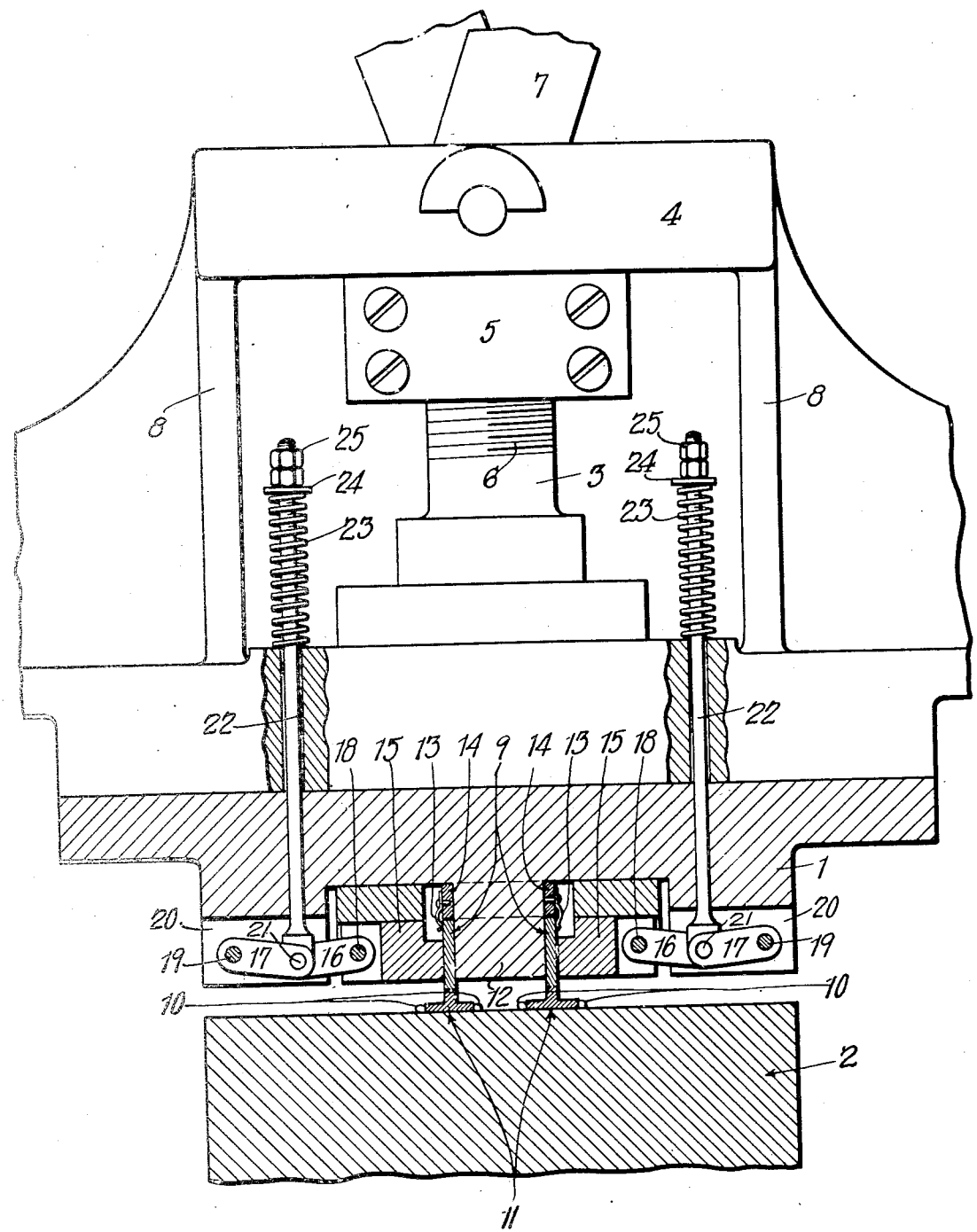
Inventor
LEROY H. HOFFER.
By His Attorneys
Usina & Rauber Patented Nov. 11, 1930

1,781,548

UNITED STATES PATENT OFFICE

LE ROY H. HOFFER, OF BROOKLYN, NEW YORK, ASSIGNOR TO METROPOLITAN ENGINEERING COMPANY, OF BROOKLYN, NEW YORK, A CORPORATION OF NEW YORK

WELDING CLAMPING DEVICE

Application filed September 26, 1929. Serial No. 395,271.

This invention relates to electric butt welding apparatus and particularly to work holding means for the movable electrode of such apparatus.

An object of the invention is to provide means for securely holding an object or objects in position in a movable electrode while said objects are brought into welding position and welded.

Other objects of the invention are to provide work holding or clamping means that permits the work or objects to be welded to be positioned in the movable electrode and automatically held or clamped therein and that automatically releases the work after welding.

The various features of the invention are illustrated in the accompanying drawings which show partly in elevation and partly in section, a portion of a welding machine embodying a preferred form of the invention.

In the accompanying drawing the invention is shown by way of example as applied to an electric butt welding machine of the type shown. In machines of this type the upper electrode 1 is lowered toward the lower electrode 2, and lifted therefrom, by means of a vertical shaft 3, secured at its lower end to the electrode 1 and extending upwardly through a cross head 4. In the initial downward movement of the electrode 1, the shaft 3 moves relatively to the cross head 4 until a block 5, threaded onto the shaft 3 passes through a vertical passage of similar shape in the cross head 4 and is just below the lower surface of the cross head. The shaft 3 is given a quarter turn so that the block 5 is not coincident with the passage in the block 4 and is overlapped by the under surface of the block. The cross head 4 is then carried downwardly by a toggle 7 carrying with it the shaft 3 and electrode 1. The cross head 4 is guided by vertical guides 8, which also serve to guide the electrode 1.

When the upper electrode 1 is in its uppermost position, work pieces 11 are placed on the upper surface of the lower electrode 2 and are positioned thereon by means of guiding jigs 10. Complementary upper work pieces 9 to be welded to the pieces 11 are placed on opposite faces of a projection 12 and are held in position by means of spring clips 13 secured to pieces 14 on the upper part of the projection.

A pair of clamping blocks 15 are mounted on opposite sides of the projection 12 to clamp the pieces 9 thereto and are slidable towards the projection by means of pairs of toggle levers 16 and 17, one pair for each block, pivoted at 18 at one end to the blocks 15 and at 19 at the other end to projections 20 on the electrode. The levers 16 and 17 are pivotally secured at 21 at their meeting ends to rods 22 that extend through vertical openings in the electrode 1 to a position such that when the shaft 3 and block 5 are drawn upwardly through the cross head 4 and the electrode 1 is in its uppermost position the upper ends of the rods 22 abut and are held by the lower face of the cross head and are therefore depressed relatively to the electrode 1. The toggles 16—17 are thereby broken or contracted drawing the blocks 15 away from the projection 12 and enabling the work pieces 11 to be placed in position for welding.

When the shaft 3 descends through the cross head 4 in the initial part of its movement, the rods 22 are pushed upwardly relatively to the electrode 1 by means of springs 23 encircling the rods 22 and confined between the upper face of the electrodes and washer discs 24 secured to the upper ends of the rods by lock nuts 25. The toggles 16—17 are thereby straightened, forcing the slidable blocks 15 toward the projection 12 and clamping the pieces 11 securely against the projection. The pieces 11 remain securely clamped to the electrode by the blocks 15 and toggles 16 and 17 until the pieces 11 have been welded to the pieces 9 and the electrode 1 has again been lifted to its uppermost position.

As the electrode 1 and pieces 9 are lifted, the pieces 11 which have been welded to the pieces 9 are lifted also, thus enabling the finished work to be removed from the electrode and new pieces 11 and 9 to be placed in position in the electrodes 2 and 1 respectively.

While the invention has been shown as applied to a vertically movable electrode, it may, with suitable modifications, be applied to electrodes moving in other positions and to mechanisms of different types and forms.

Through the above invention a means is provided in which the work may be held in position with precision and certainty and in which the placing and replacing of the work pieces may be accomplished with ease and rapidity.

Having described the invention, what I claim and desire to secure by Letters Patent is:

1. In a welding apparatus, a pair of electrodes, work clamping means for said electrodes and means for automatically releasing said clamping means upon the separation of said electrodes to a determined distance.

2. A welding electrode having movable clamping means, a toggle for forcing said clamping means to clamping position, means on said electrode resiliently forced in a direction opposite to the movement of said electrode to welding position and acting to straighten said toggle and forcing said clamping means to clamping position and a stop to hold said toggle straightening means against said resilient pressure upon the withdrawal of said electrode to a determined position from welding position.

3. A welding electrode which comprises a fixed clamping surface, a movable clamping surface, toggles for forcing said movable surface towards said fixed surface, yieldable means for straightening said toggle and a means at a fixed point in the path of withdrawal of said electrode from welding position to break said toggle.

4. A welding electrode which comprises fixed and movable clamping means, yieldable means for urging said movable means toward said fixed means and means for withdrawing said movable means from said fixed means when said electrode reaches a determined distance from its welding position.

5. A welding electrode which comprises fixed and movable clamping means, yieldable means for urging said movable means toward said fixed means and means for withdrawing said movable means from said fixed means when said electrode reaches a determined distance from its welding position and means for holding objects in said electrode when said clamping means is opened.

6. A welding electrode having a fixed clamping means, a movable clamping means slidable towards said fixed means to clamp an object to be welded therebetween, a toggle on said electrode to move said movable clamping means to clamping position upon being straightened, a rod connected to said toggle, a spring acting on said rod in a direction opposite to welding position to straighten said toggle and means to move said rod relatively to said electrode against the action of said spring to loosen said toggle when said electrode reaches a determined position of withdrawal from welding position.

7. A welding electrode having a downwardly projecting, fixed, clamping block, a clamping block slidable towards said fixed clamping block, a toggle pivoted at one end to the electrode and at its other end to said movable clamping block, a rod secured to the joint of said toggle and projecting away from the welding position of said electrode, a spring acting on said rod to force it to straighten said toggle in a direction opposed to welding position and a means to engage and hold said rod against the action of said spring as said electrode reaches a fixed distance from welding position.

8. A welding apparatus comprising a fixed electrode, an electrode movable toward said fixed electrode, work clamping means on said movable electrode, means yieldably forcing said clamping means to clamping position and means acting when said movable electrode is drawn to a determined distance from said fixed electrode to withdraw said movable electrode from said fixed electrode.

9. A welding electrode which comprises fixed and movable clamping means, yieldable means for urging said movable means toward said fixed means, and means for compressing said yieldable means to withdraw said movable means from said fixed means when said electrode reaches a determined distance from its welding position and for releasing said yieldable means when said electrode advances to said determined distance toward said welding position.

10. A welding electrode which comprises fixed and movable clamping means, yieldable means for urging said clamping means towards said fixed clamping means, and means for releasing said yieldable means when said electrode advances a determined distance towards its welding position.

In witness whereof, I have hereunto signed my name

LE ROY H. HOFFER.